United States Patent [19]  
Hayashida

[11] 4,094,437  
[45] June 13, 1978

[54] CAP ASSEMBLY AND METHOD FOR PRODUCING THEREOF

[75] Inventor: Yoshihiro Hayashida, Chigasaki, Japan

[73] Assignee: Tokico Ltd., Kawasaki, Japan

[21] Appl. No.: 827,812

[22] Filed: Aug. 25, 1977

[30] Foreign Application Priority Data

Mar. 19, 1977 Japan .................................. 52-30771  
Aug. 30, 1976 Japan .......................... 51-116029[U]

[51] Int. Cl.² ............................................ B65D 51/16
[52] U.S. Cl. .................................... 220/374; 220/307; 220/367; 340/244 E; 200/84 R; 113/121 C; 220/306
[58] Field of Search ............... 220/367, 374, 306, 307; 307/118; 340/244 E; 200/84 R; 113/121 C

[56] References Cited

U.S. PATENT DOCUMENTS 3,077,283 2/1963 Shutt et al. ............................ 220/374  
3,385,467 5/1968 Lindenberg ........................... 220/374

Primary Examiner—George T. Hall

[57] ABSTRACT

A cap assembly for the reservoir of a vehicular brake comprising a cap body and a cap cover, the cap body including a first cylindrical portion adapted to be received in the opening of said reservoir, a flange integrally formed with and radially and outwardly extending from the first cylindrical portion and a second cylindrical portion extending from the side of the flange opposite the side of the flange adjacent from the first cylindrical unit; and the cap cover including a third cylindrical portion adapted to fit on the second cylindrical portion of the cap body and closed at one end; the second and third cylindrical portions having mating radial tongue and groove engaging means and the closed end of the third cylindrical portion covering the second cylindrical portion to thereby close the opening of the reservoir. A method for producing a cap assembly for the reservoir of a brake which comprises a cap body and a mating cap cover connected together by means of tongue and groove engagement.

15 Claims, 12 Drawing Figures

CAP ASSEMBLY AND METHOD FOR PRODUCING THEREOF

BACKGROUND OF THE INVENTION

This invention relates to a cap assembly for the reservoir of a vehicular brake which comprises two parts such as a cap body and a cap cover and a method for producing the reservoir cap assembly.

A synthetic resin cap assembly for the reservoir of a vehicular brake which comprises two parts such as a cap body and a cap cover has been known. In the prior art reservoir cap assembly comprising the two parts, the cap body and cap cover are separately formed so as to have mating portions which contact face-to-face when the two parts are assembled, then assembled so as to cause the mating portions to contact face-to-face and finally are connected together by means of adhesive, heat welding or ultrasonic welding. However, in the prior art reservoir cap assembly referred to hereinabove, the adhesive applied to the contacting faces is easily attacked by the brake liquid within the reservoir when the parts are connected together by the adhesive. And when the two parts are connected together by means of heat welding or ultrasonic welding, it can not be expected that the contacting faces of the mating portions of the two parts are connected uniformly and perfectly and as a result, the contacting faces of the mating portions of the parts tend to easily separate from each other.

A cap assembly for the reservoir of a brake which is provided with a critical liquid surface warning device has been also known. In such a prior art reservoir cap assembly, when the reservoir in conjunction with which the reservoir cap assembly is employed is subjected to oscillation, the liquid or brake oil within the reservoir tends to flow from the interior of the reservoir through the vent hole in the cap into the chamber defined by the cap and thus, it is not possible to perfectly prevent the liquid from adhering to the sealant which seals the opening of the section containing the detection switch of the critical liquid surface warning device. As a result, such a prior art reservoir cap assembly having a critical liquid surface warning device has the disadvantage that the brake liquid tends to deteriorate the sealant formed of epoxy resin and the coating on the lead lines of the critical liquid surface warning device, damage the contact of the detection switch and cause short-circuit due to the contact between the lead lines.

SUMMARY OF THE INVENTION

Therefore, one object of the present invention is to provide a cap assembly for the reservoir of a brake which can effectively eliminate the disadvantages inherent in the prior art reservoir cap assemblies, which can perfectly prevent separation of the cap body and cap cover from each other and which can be easily assembled.

Another object of the present invention is to provide a novel and improved cap assembly for the reservoir of a brake in which the critical liquid surface warning device containing section is perfectly isolated from the area which communicates between the interior of the reservoir and the atmosphere to thereby prevent the brake liquid from flowing into the critical warning device containing section.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 2 - 1 is an exploded view in section of said cap assembly as shown in FIG. 1;

FIG. 2 — 2 is a sectional view of said cap assembly showing the same in its assembled condition;

FIG. 2 - 3 is similar to FIG. 2 — 2, but shows an alternate method of assemblying said cap assembly;

FIGS. 3 - 1, 3 - 2 and 3 — 3 are fragmentary sectional views of modified embodiments of the present invention;

PREFERRED EMBODIMENTS OF THE INVENTION

Figure 1:
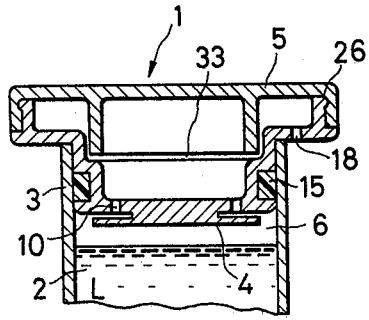
FIG. 1 is a sectional view of a brake oil reservoir having a reservoir cap assembly constructed in accordance with the present invention placed on the top of said reservoir.

The present invention will now be described referring to the accompanying drawings and more particularly, to FIGS. 1, 2 - 1, 2 — 2 and 2 - 3 thereof in which the first preferred embodiment of the invention is shown. In FIG. 1, the reservoir cap assembly 1 of the invention is shown as being placed on the circular opening 3 which receives a liquid or brake oil L at the upper end of an oil reservoir 2. However, it is to be understood that the cap assembly 1 can be equally employed in connection with the opening 3 which has any configuration other than the circular configuration as shown.

Figures 1, 2:
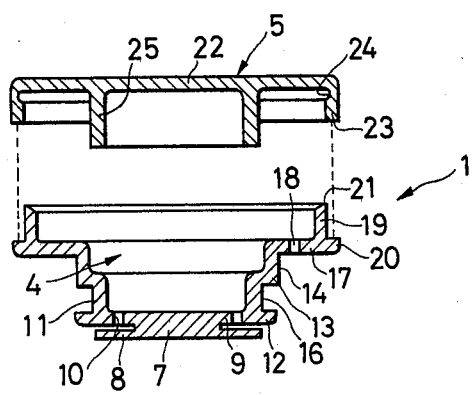
Figure 2:
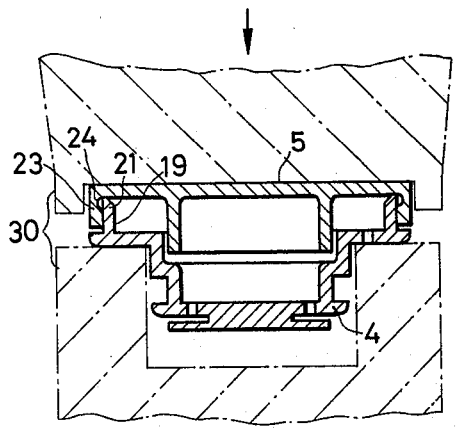

As is more clearly shown in FIG. 2 - 1, the cap assembly 1 comprises a synthetic resin lower member or cap body 4 and a similar synthetic resin upper member or cap cover 5 which mates with the cap body 4.

The cap body 4 has a bottom 7 opposite to an air space 6 defined in the opening 3 above the surface of liquid L and the bottom 7 is a double construction including a lower bottom portion 8 and an upper bottom portion 9 provided with vent holes 10. The lower bottom portion 8 serves to prevent the liquid L from flowing into the vent holes 10 directly. A cylindrical wall 11 extends uprightly from the upper bottom portion 9 in a position spaced radially and outwardly from the vent holes 10 and is integral with the upper bottom portion 9. The upper bottom portion 9 is further formed with a first flange 12 which extends radially and outwardly from the lower end of the upright cylindrical wall 11 and an enlarged portion 13 integrally extends from the upper end of the upright cylindrical wall 11. A first annular member 14 integrally and uprightly extends from the outer edge of the enlarged portion 13. The first annular member 14 and first flange 12 have the outer diameter substantially corresponding to the inner diameter of the opening 3 in the oil reservoir 2. The enlarged portion 13, upright wall 11 and first flange 12 defines an annular groove 16 therebetween for receiving an annular seal 15 in the groove. Thus, when a first cylindrical unit consisting of the bottom 7, upright wall 11, first flange 12, enlarged portion 13 and first annular member 14 is held in position in the opening 3, the radially outer peripheral surfaces of the flange 12, first annular member 14 and seal 15 closely fit on the inner surface of the opening 3 to prevent the liquid L from flowing out of the opening 3.

A second flange 17 integrally extends radially and outwardly from the upper end of the first annular member 14 and is formed with a vent hole 18 in a position spaced radially and outwardly from the outer surface of the opening 3 (see FIG. 1) when the cap body 4 is held in position in the opening 3. A second annular member 19 extends integrally and uprightly from the second flange 17 in a position spaced radially and outwardly from the vent hole 18 to provide a second cylindrical unit. The second flange 17 is further provided with a third flange 20 in a position spaced radially and outwardly of the second annular member 19.

The upper member or cap cover 5 has an outer cylindrical portion 23 integrally depending from the outer edge of the top 22 and the inner diameter of cylindrical portion 23 substantially corresponds to the outer diameter of the second annular member 19. An annular groove 24 is defined in the junction between the top 22 and outer cylindrical portion 23 and the cap cover 5 also has an inner cylindrical portion 25 depending from the top 22 in a position spaced radially and inwardly from the outer cylindrical portion 23.

As is more clearly shown in FIG. 1, the outer diameter of the inner cylindrical portion 25 is somewhat smaller than the inner diameter of the first annular member 14 and the length or height of the inner cylindrical portion 25 is so selected that the lower end of the cylindrical portion 25 does not contact the enlarged portion 13 when the cap body 4 and cap cover 5 are assembled to thereby define a clearance or passage 33 between the cylindrical portion 25 and enlarged portion 13. Thus, air from the atmosphere is permitted to pass through the vent hole 18, passage 33 and vent hole 10 into the air space 6 above the surface of liquid L within the opening 3.

In the cap assembly 1 of the invention, it is necessary that the length or height of the second annular member 19 of the cap body 4 be longer than the length or height of the outer cylindrical portion 23 of the cap cover 5.

After the cap body 4 and cap cover 5 have been formed in the manner mentioned hereinabove, the cap body 4 and cap cover 5 are assembled in such a manner that the inner surface of the cylindrical portion 23 on the cap cover 5 is telescopically fitted on the outer surface of the second annular member 9 of the cap body 4 and the inner cylindrical portion 25 of the cap cover 5 is freely received in the first annular member 14 of the cap body 4 (see FIG. 2 — 2). At this time, since the length or height of the second annular member 19 is greater than that of the outer cylindrical portion 23, the upper end 21 of the second annular member 19 abuts against the top 22 of the cap cover 5 adjacent the annular groove 24 to prevent the lower edge of the cylindrical portion 23 from contacting the third flange 20. The thus obtained assembly is then placed in an ultrasonic welding device 30 (shown by the one-dot-chain lines in FIG. 2 — 2) in which the upper end 21 of the second annular member 19 is welded to the top 22 of the cap cover 5 adjacent the annular groove 24 while the cap body 4 and cap cover 5 are being pressed together. In the ultrasonic welding referred to above, the cap body 4 and cap cover 5 are welded together only at the areas where the two parts abut against each other by being subjected to the oscillation caused by the ultrasonic waves. Since the material of the second annular member 19 is fused at its upper end 21 by only the portion or distance along the length of the member which exceeds the length or height of the cylindrical portion 23 and the cap body 4 and cap cover 5 are pressed together, the fused material or resin of the upper end 21 of the second annular member 19 included in the above-mentioned portion or distance thereof flows into the annular groove 24 until the lower end of the cylindrical portion 23 comes into contact with the third flange 20 of the cap body 4 to form an annular projection 26 which provides a tongue and groove connection in cooperation with the groove 24 (see FIG. 1).

Thereafter, the annular groove 24 and annular projection 26 are cooled to solidify the material in the tongue and groove connection whereby the cap body 4 and cap cover 5 are perfectly welded together into a unitary assembly.

In the illustrated embodiment, although the annular groove 24 is shown as a continuous form, it will be apparent to those skilled in the art that the annular groove 24 may be in the form of a discontinuous groove consisting of a plurality of discrete sectors or replaced by a series of through holes provided at a strategic area of the cylindrical portion 23 of the cap cover 5 (the annular groove 24, discontinuous annular groove or series of through holes will be generally referred to "recess or recesses" hereinafter) whereby any relative rotation between the cap body 4 and cap cover 5 can be positively prevented.

The inner side or side of the upper end 21 of the second annular member 19 opposite from the side thereof adjacent the annular groove 24 is bevelled so that the material at the upper end 21 of the second annular member 19 can be easily fused and the fused material can easily flow into the annular groove 24.

In the foregoing, although it has been described that the upper end 21 of the second annular member 19, the annular groove 24 and the areas in the vicinity of the upper end and groove are heated by the ultrasonic welding device 30, instead the material of the upper end 21 of the second annular member 19 can be fused and softened by means of a heat plate or the like prior to the assembling of the cap body 4 and cap cover 5 together and then applied to the cap cover 5. That is, as shown in FIG. 2 - 3, the material of the upper end 21 of the second annular member 19 is fused and softened by means of an iron plate 31 having a nichrome wire or the like as the heat source therein, the iron plate 31 is then removed, the cap cover 5 is applied on the cap body 4 and the cap body and cover are pressed together in a pressed 32 to cause the fused material of the upper end 21 of the second annular member 19 to flow into the annular groove 24 to form the projection 26. The term "fusing or fused" employed herein implies that a solid material is transformed into a fluidal state or the solid material is merely rendered more soft than when the solid material is at a cold temperature maintaining its solid form.

Figures 2, 3:
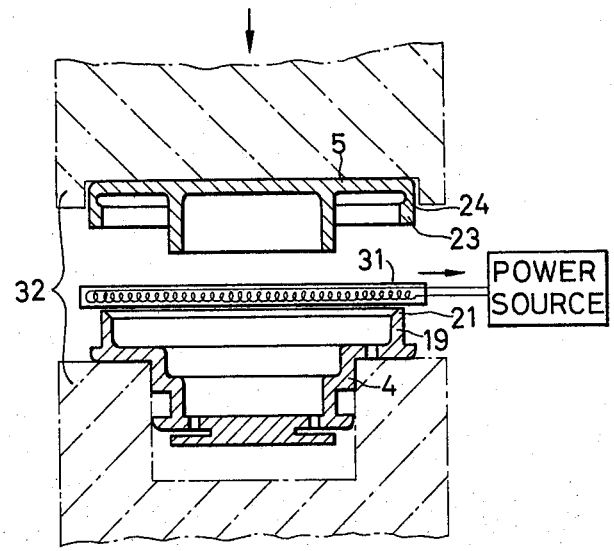
Figures 1, 3:
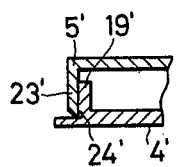
Figures 2, 3:
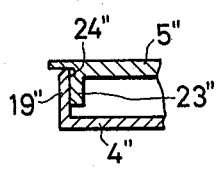
Figure 3:
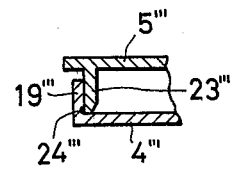

FIGS. 3 - 1, 3 - 2 and 3 — 3 fragmentarily show different modified embodiments of the invention. In FIG. 3 - 1, the annular groove 24' is provided in the outer surface of the base or lower end of the second annular member 19' on the cap body 4' and the outer cylindrical portion 23' of the cap cover 5' is fitted on the second annular member 19'. In FIG. 3 - 2, the annular groove 24" is provided in the outer surface of the base or upper end of the outer cylindrical portion 23" on the cap cover 5" and the second annular member 19" of the cap body 4" is fitted on the cylindrical portion 23" of the cap cover 5". In FIG. 3 — 3, the annular groove 24''' is provided in the inner surface of the base or lower end of the second annular member 19''' on the cap body 4''' and the outer cylindrical portion 23''' of the cap cover 5''' is fitted in the annular member 19''' of the cap body 4'''. In each of the embodiment shown in FIGS. 3 - 1, 3 - 2 and 3 — 3, the length or height of the annular member or cylindrical portion provided with the annular groove is less than that of the mating cylindrical portion or annular member not provided with such groove, and the fused material at the area of the longer annular member or cylindrical portion adjacent the annular groove in the mating shorter cylindrical portion or annular member is fused to flow into the groove so as to form a radial annular tongue and groove connection whereby the cap body and cap cover are assembled together into a unitary assembly.

Figure 5:
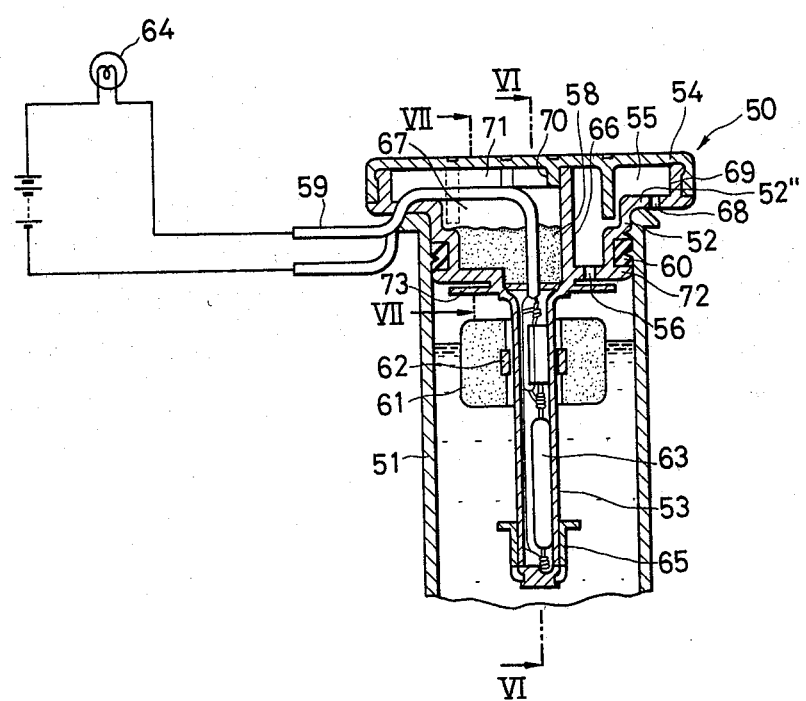
FIG. 5 is a sectional view of another embodiment of reservoir cap assembly constructed in accordance with the present invention.
Figure 6:
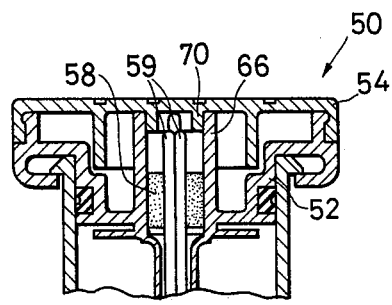
FIG. 6 is a sectional view taken substantially along the line VI — VI of FIG. 5.
Figure 7:
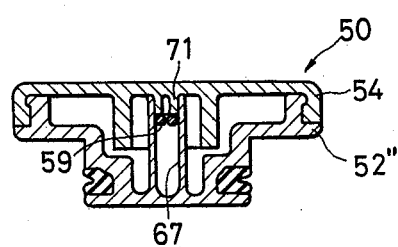
FIG. 7 is a sectional view taken substantially along the line VII — VII of FIG. 5.

FIG. 5 shows a further modified embodiment of the present invention in which the cap assembly of the invention is embodied as a reservoir cap provided with a critical liquid surface warning device.

Figure 4:
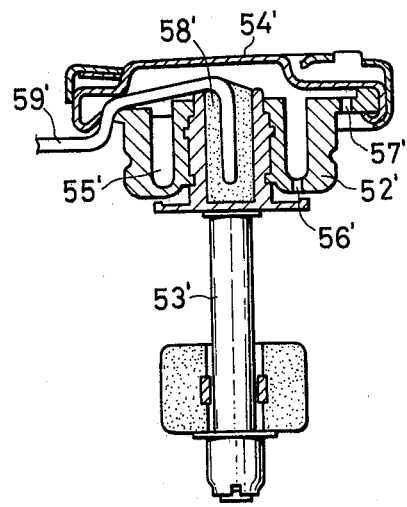
FIG. 4 is a sectional view of one prior art reservoir cap assembly.

Before explaining details of the embodiment of FIG. 5, reference will be first made to FIG. 4 in which one prior art reservoir cap assembly with a critical liquid surface warning device is shown in order to assist the understanding of the present invention.

As shown in FIG. 4, the prior art reservoir cap assembly with a critical liquid surface warning device comprises a hollow cap body 52' for directly contacting the inner surface of the opening at the top end of a brake oil reservoir tank (not shown) to seal the opening, a cylinder 53' depending from the cap body 52' and holding the read switch of a critical liquid surface warning device (not shown) and a cap cover 54' placed on the top of said cap body 52' and surrounding an upper portion of the cap body. The hollow cap body 52' has a vent hole 56' communicating between a chamber 55' defined in the cap body and the interior of the reservoir tank and a second vent hole 57' communicating the chamber 55' with the outer air and is adapted to allow the outer air to freely flow into the reservoir as the surface of liquid within the reservoir falls down. The cylinder 53' has a lower portion a case for receiving the reed switch and the like and in an upper portion a support member containing a sealant 58' and fitted in the cap body 52'. In the prior art cap assembly, when the liquid within the reservoir tank is caused to flow through the vent hole 56' into the chamber 55' defined in the cap body 52' as the reservoir tank oscillates, the liquid tends to adhere to lead line 59' lines (only one lead line is shown) which extend from within the sealant 58' to the exterior of the reservoir tank. When the liquid adheres to the lead line 59', a crack or cracks develop in the sealant 59' and the liquid flows through the crack or cracks in the sealant 58' to and through the support member and then to and into the case of the cylinder 53' to thereby damage the contacts of the reed switch and/or the coating on the lead line resulting in occurrence of short-circuit and other troubles.

The embodiment of cap assembly shown in FIGS. 5 and 8 can effectively eliminate the disadvantages inherent in the prior art cap assembly referred to hereinabove, and as shown in FIG. 5, the cap assembly 50 generally comprises a cap body 52 sealed to the upper edge of the reservoir 51, a cylinder 53 depending from the cap body 52 and a cap cover 54 fitted on the cap body 52 in the same manner as mentioned in connection with the embodiments of FIG. 1 through FIG. 3 — 3.

The cap body 52 is formed of resin and the like material and fitted in the reservoir 51 with an annular seal 60 interposed between the inner surface of the reservoir and the outer surface of the cap body. The cylinder 53 is integrally formed with and depends from substantially the center of the cap body and receives a reed switch 63 therein. An annular float 61 is freely disposed about the cylinder 53 and floats within the liquid with the top of the float positioned by a predetermined distance above the surface of liquid. An annular magnet 62 is partially embedded in the inner surface of the float 61. As the surface of liquid falls down, the float 61 and accordingly, the magnet 62 therein moves downwardly along the cylinder 53 to the contact of the reed switch 63 to actuate the switch which in turn energizes a warning lamp 64 which is electrically connected to the reed switch 63 by suitable means of which description will be made hereinafter. The float 61 has a stop 65 secured at the lower end to prevent the float 61 from falling off the cylinder 53.

Figure 8:
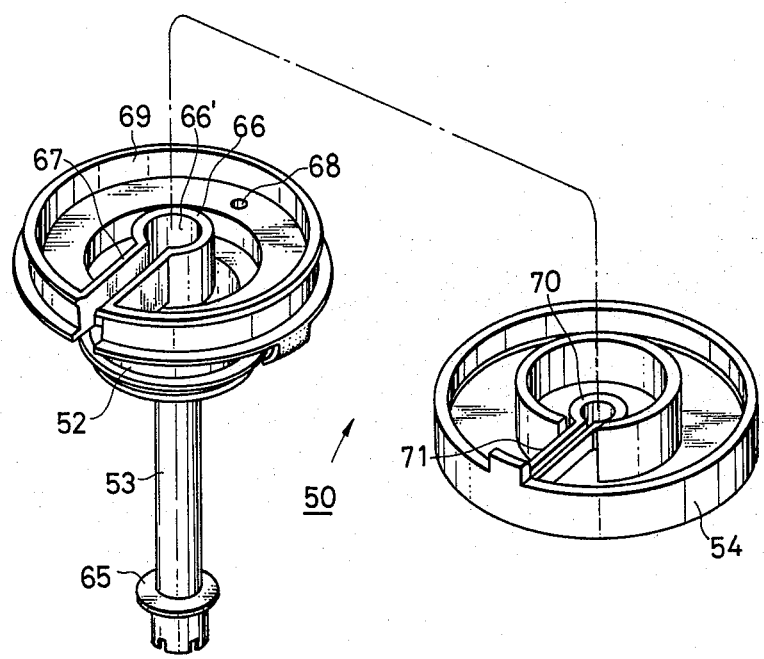
FIG. 8 is an exploded perspective view of said cap assembly of FIG. 5.

The cylinder 53 has a substantially circular enlarged wall portion 66 integrally formed with and extending uprightly from the top of the cylinder and as shown in FIG. 8, the enlarged wall portion defines a key-shaped opening therein on the top of the cylinder 53. More particularly, the key-shaped opening consists of a circular portion 66' and an elongated shank portion 67 extending radially and outwardly from and communicating at one or the inner end with the circular portion 66'. Filled within the enlarged wall portion 66 is a sealant 58 formed of epoxy resin or the like material and having a thickness and a plurality of lead lines 59 extend through the sealant 58 with one end electrically connected to the reed switch 63 and the other end extending through the shank portion 67 to be electrically connected to the lamp 64.

The base end or bottom 72 of the cap body 52 which is integral with the lower end of the enlarged wall portion 66 has a vent hole 56 through which air from the atmosphere is allowed to flow into the reservoir 51 as the surface of liquid in the reservoir falls down. The cap body 52 has a flange 52" integrally formed with and extending radially and outwardly from the upper edge of the cap body and a second vent hole 68 is provided in the flange 52" to communicate between the interior of the reservoir 51 and the atmosphere.

As is clear from the showimg of FIG. 8, an outer cylindrical wall 69 is integrally formed with and extends upwardly from the flange 52" and the upper edge of the upright wall 69 lies in the same plane as the upper edge of the wall portion 66. The cap cover 54 has a plug portion depending from the top of the cover and having a key-shaped configuration substantially corresponding to that of the key-shaped wall portion 66 on the cap body 52. The key-shaped wall on the cap cover 54 consists of a circular portion 70 and an elongated shank portion 71 extending radially and outwardly from the circular portion 70 which are adapted to be snugly fitted in the circular portion 66' and shank portion 67 of the key-shaped wall portion 66 on the cap body 52, respectively to seal the wall portion 66 in an air-tight relationship. The wall portion 66, wall 69 and flange 72 of the cap body 52 define a chamber 55 therebetween and the chamber 55 and vent holes 56, 68 have the function to communicate between the interior of the reservoir 51 and the atmosphere.

As mentioned hereinabove, according to the present invention, the two parts of the cap assembly are connected together in the rongue and groove engagement and welded together and the air communication passage means communicating between the interior of the reservoir and atmosphere is perfectly shielded from the critical liquid surface warning device receiving section by the wall means. Therefore, even if the various welds are not perfectly formed, since the cap body and cover are connected by the tongue and groove connection, the two parts are restrained from their relative movement in the axial direction and prevented from separating from each other. Thus, the present invention provides a cap assembly which is reliable in operation and can be easily assembled. And in the embodiments as shown in FIGS. 1 and 3 — 3, the welds are concealed from the exterior, even if the welds have excessively high protrusions, the cap assembly presents an acceptable appearance. Furthermore, when the vehicle starts or stops suddenly, as the reservoir 51 oscillates, even if the baffle 73 fails to prevent the liquid from flowing into the vent hole 56, the liquid which has flowed in the chamber 55 through the vent hole 56 is positively prevented from flowing into the wall portion 66. Thus, the damage of the reed switch and/or failure of the lead lines which will otherwise occur when the brake liquid invades into the reed switch case can be perfectly prevented.

While only several embodiments of the invention have been shown and described in detail, it will be understood that the same are for illustration purpose only and not to be taken as a definition of the invention, reference being had for the purpose to the appended claims.

What is claimed is:

1. A cap assembly for the reservoir of a vehicular brake comprising a cap body and a cap cover, said cap body a bottom being provided with a vent hole communicating between the interior of said reservoir and an air space, including a first cylindrical portion adapted to be received in the opening of said reservoir, a flange integrally formed with and radially and outwardly extending from said first cylindrical portion and having a vent hole communicating between said air space and the exterior of said reservoir radially and outwardly of said opening of the reservoir and a second cylindrical portion extending from the side of said flange opposite from the side of the flange adjacent said first cylindrical portion; and said cap cover including a third cylindrical portion fitted on said second cylindrical portion of the cap body and closed at one end; said second and third cylindrical portions having mating radial concave and convex engaging means and said closed end of the third cylindrical portion covering said second cylindrical portion of the cap body to thereby close said opening of the reservoir.

2. The cap assembly as set forth in claim 1, in which said concave and convex engaging means of the second and third cylindrical portions comprise a continuous groove and a mating continuous convex.

3. The cap assembly as set forth in claim 1, in which said mating radial concave and convex engaging means comprise a discontinuous groove and a mating convex.

4. The cap assembly as set forth in claim 1, in which said mating radial concave and convex engaging means comprise through holes and mating projections.

5. The cap assembly as set forth in claim 1, in which said mating radial concave and convex engaging means comprises an annular recess formed in the inner surface of said closed end of the third cylindrical portion and a mating annular convex formed on the outer surface of the upper end of the second cylindrical portion.

6. The cap assembly as set forth in claim 1, in which said mating radial concave and convex engaging means comprise an annular recess formed in the outer surface of the lower end of said second cylindrical portion and a mating annular convex formed in the inner surface of the lower end of said third cylindrical portion.

7. The cap assembly as set forth in claim 1, in which said mating radial concave and convex engaging means comprise an annular recess formed in the outer surface of said closed end of the third cylindrical portion and a convex formed on the inner surface of the upper end of said second cylindrical portion.

8. The cap assembly as set forth in claim 1, in which said mating radial concave and convex engaging means comprise an annular recess formed in the inner surface of the lower end of said second cylindrical portion and a mating annular convex formed on the outer surface of the lower end of said third cylindrical portion.

9. The cap assembly as set forth in claim 1, in which said cap body further includes an additional cylindrical portion formed on the bottom thereof extending into said opening of the reservoir and receiving a critical liquid surface warning device and a wall portion communicating the interior of said additional cylindrical portion with the exterior of said cap whereby a wall portion communicating the interior of said reservoir with the atmosphere is fluidly isolated from said additional cylindrical portion.

10. The cap assembly as set forth in claim 9, in which said cap cover includes a wall and a plug portion adapted to snugly fit in said wall portion communicating said interior of the additional cylindrical portion with the exterior of the cap.

11. The cap assembly as set forth in claim 9, in which said wall portion communicating said interior of the additional cylindrical portion with the exterior of the cap has a substantially key-shaped cross-section.

12. A method for producing a cap assembly for the reservoir of a vehicular brake comprising a synthetic resin cap body including a first cylindrical portion adapted to be received in the opening of said reservoir, a flange integrally formed with said first cylindrical portion and having an outer diameter greater than the outer diameter of said cylindrical portion and a second cylindrical portion integrally formed with and extending from the side of said flange opposite from the side thereof adjacent said first cylindrical portion and a synthetic resin cap cover including a third cylindrical portion adapted to fit on said second cylindrical portion of the cap body and closed at one end, said method comprising the step of forming a recess in the peripheral surface of the base end of one of said second cylindrical portion and third cylindrical portion, the length of the other of said second and third cylindrical portions in the axial direction being greater than the length of said one of the second and third cylindrical portions in the axial direction, and fusing the material of a portion of said other cylindrical portion in excess of the length of said one cylindrical portion while pressing said cap body and cap cover together so as to allow the fused material to flow into said recess to thereby form a convex which provides a concave and convex engaging means in co-operation with the recess.

13. The method as set forth in claim 12, in which said second and third cylindrical portions are telescopically connected and the material of said excess portion of the other cylindrical portion is then fused while said cap body and cap cover are being pressed together.

14. The method as set forth in claim 12, in which said material of the excess portion of the other cylindrical portion is preliminarily fused and softened, said second and third cylindrical portions are telescopically connected and said fused material is forced to flow into said recess while said cap body and cap cover are being pressed together.

15. The method as set forth in claim 13, in which said fusing is performed by ultrasonic welding.

* * * * *